United States Patent [19]

Jacob

[11] Patent Number: 4,690,508

[45] Date of Patent: Sep. 1, 1987

[54] LIQUID CRYSTAL CLOSED-LOOP CONTROLLED MIRROR SYSTEMS

[75] Inventor: Keith D. Jacob, Ann Arbor, Mich.

[73] Assignee: C-D Marketing, Ltd., Ann Arbor, Mich.

[21] Appl. No.: 735,419

[22] Filed: May 17, 1985

Related U.S. Application Data

[63] Continuation-in-part of Ser. No. 449,949, Dec. 15, 1982, abandoned.

[51] Int. Cl.$^4$ .................... G02B 17/00; G02F 1/13
[52] U.S. Cl. ............................. 350/331 R; 350/279; 350/283; 350/332
[58] Field of Search ................ 350/278–283, 350/331 R, 338, 342, 332

[56] References Cited

U.S. PATENT DOCUMENTS

| | | | |
|---|---|---|---|
| 3,280,701 | 10/1966 | Donnely et al. | 350/278 |
| 3,601,614 | 8/1971 | Pletzer | 350/279 |
| 3,815,982 | 6/1974 | Wagensonner | 350/331 R X |
| 3,862,798 | 1/1975 | Hopkins | 350/331 R |
| 3,910,688 | 10/1975 | Yamashita | 350/279 |
| 4,005,928 | 2/1977 | Kmetz et al. | 350/331 R X |
| 4,443,057 | 4/1984 | Bauer et al. | 350/637 |
| 4,475,031 | 10/1984 | Mockovciak | 350/331 R |

FOREIGN PATENT DOCUMENTS

| | | | |
|---|---|---|---|
| 2808260 | 8/1979 | Fed. Rep. of Germany | 350/331 R |
| 2029343 | 3/1980 | United Kingdom | 350/331 R |

OTHER PUBLICATIONS

Millman et al, *Electronic Devices and Circuits*, Chpt. 18, pp. 558–565, New York, copyright 1967.

*Primary Examiner*—John K. Corbin
*Assistant Examiner*—David Lewis
*Attorney, Agent, or Firm*—Rhodes and Boller

[57] ABSTRACT

A rearview mirror system comprises an electrically controlled optical transmission plate disposed over a reflecting surface. The optical transmission plate is selectively operable to any of a number of different states of opaqueness between a maximum light transmission and a maximum opaqueness. The opaqueness of the optical transmission plate is controlled by an electronic circuit which includes two sensors, one for sensing the brightness of incident light from the field of view and the other for sensing ambient light. The control operates to cause the light which is incident on the reflecting surface to be closed loop regulated to a desired degree of brightness which is also correlated with ambient light conditions. A manually operable adjustment is also provided for the observer to set a desired brightness characteristic.

39 Claims, 9 Drawing Figures

LIQUID CRYSTAL CLOSED-LOOP CONTROLLED MIRROR SYSTEMS

REFERENCE TO A RELATED APPLICATION

This application is a continuation-in-part of Ser. No. 449,949 filed Dec. 15, 1982 now abandoned.

BACKGROUND AND SUMMARY OF THE INVENTION

This invention relates to liquid crystal controlled mirror systems. The usual liquid crystal controlled mirror comprises a liquid crystal unit disposed over a mirrored reflecting surface with the liquid crystal unit being selectively energized via an electric circuit. The preferred embodiment of the invention disclosed herein is a rearview mirror system of an automotive vehicle.

Liquid crystal controlled rearview mirror systems have heretofore been proposed for automotive applications. Some of applicant's own inventions disclosed in prior patents and pending applications, and commonly assigned, have involved liquid crystal controlled mirror systems. Illustrative of some uses of liquid crystal controlled mirrors are day/night rearview mirrors and mirrors for selectively expanding the field of view to the rear under certain operating conditions, such as when the vehicle turn signals are being operated.

The practice in the past has been to operate liquid crystal controlled mirrors by switching the liquid crystal medium between two extremes, one of maximum transparency (i.e. maximum reflectivity) and the other of maximum opaqueness (i.e. minimum reflectivity). In a day/night liquid crystal controlled rearview mirror of that type, a photocell sensed the presence of headlights from the rear and was operable to switch the mirror from its maximim reflectivity to its minimum reflectivity condition. When the headlamps were no longer incident on the photocell, the mirror reverted to its maximum reflectivity state. U.S. Pat. Nos. 3,862,798; 4,200,361; U.K. Patent Application No. 2,029,343; and German Offenlegungsschrift No. 2,808,260 illustrate such prior mirrors.

Another practice in the past has been to place the liquid crystal unit directly over the reflecting surface such that the two are in parallel planes. Because a liquid crystal unit comprises a number of optical interfaces there are inherent first surface reflections of the field of view at these interfaces, even though they are of substantially less intensity than the desired reflection from the mirrored surface. Since the image which is intended to be reflected to the observer is that which is reflected by a mirrored reflecting surface alone, first surface reflections from the additional optical interfaces can impair the quality of the image presented to the observer. The extent to which these can be troublesome can be severe enough to render this type of mirror commercially unacceptable for certain uses. German Offenlegungsschrift No. 2,808,260 has proposed to incline the plane of the liquid crystal unit relative to the plane of the mirrored reflecting surface.

The present invention relates to improvements in liquid crystal controlled mirror systems, and in the usage of the invention disclosed herein the improvements are illustrated in connection with a rearview mirror system of an automotive vehicle. The improvements contemplated by the present invention involve a number of different aspects.

For one, the construction of the liquid crystal controlled mirror assembly itself comprises a new and unique arrangement and organization of components which can provide a self-contained unit suited for both original equipment manufacture (OEM) and after-market. With this aspect of the improvement, controls for the mirror are entirely self-contained within the mirror assembly itself, and these provide for automatic and/or manual adjustment of the operating characteristics to suit particular operating conditions and/or a particular occupant of the vehicle who is using the mirror. Thus the invention is compact, readily installable, versatile, and adaptable to the user's needs.

Another aspect of the invention, in a particular embodiment thereof which uses light polarizers as part of the liquid crystal unit, involves the cooperative organization and arrangement of the liquid crystal unit and reflecting surface in relation to the geometry of the automotive vehicle within which the mirror is disposed. This offers a solution to the first surface reflection problem described above in liquid crystal controlled mirrors where the liquid crystal unit and the reflecting surface are in parallel planes. The improvement provided by this aspect comprises the liquid crystal unit being disposed in a plane which is at a small acute angle to the plane of the reflecting surface with the mirror assembly being disposed in the vehicle such that any inherent first surface reflections from the liquid crystal unit which would be presented to the observer are not from the desired rear field of view through the vehicle backlight, but rather are obtained from an inactive, non-distracting portion of the vehicle's interior, particularly the headliner. A particular advantage of this aspect of the invention is that observer attention can be better directed to the desired rear field of view presented by the mirrored reflecting surface and with virtual elimination of distractions to that field of view from inherent first surface reflections from the optical interfaces of the liquid crystal unit.

In another particular embodiment which does not use polarizers as part of the liquid crystal unit, the mirrored surface can be in a parallel plane to that of the liquid crystal unit. Indeed, a very compact construction is possible by making the mirrored surface a part of the liquid crystal unit itself.

Another of the aspects of the invention involves the achievement of a new mode of operation of a liquid crystal controlled mirror whereby the degree of opaqueness of the liquid crystal solution can be controlled over a range of different opaquenesses to achieve varying degrees of reflectivity in response to varying lighting conditions, such as incident light on the mirror. This capability is achieved in the preferred embodiment through the disposition of a light sensing device between the liquid crystal unit and the reflecting surface such that light from the rear field of view which is incident on the sensor is attenuated by the degree of opaqueness of the liquid crystal solution. The light sensor is operatively coupled in a closed loop control with the liquid crystal unit such that opaqueness of the liquid crystal medium is caused to faithfully respond to variations in the incident light intensity so as to maintain a level of incidence on the reflecting surface in accordance with a command input level which is set by the observer to his or her own preference. In this way the reflected field of view seen by the observer is automatically regulated in intensity by automatic compensation for variations in incident light from the field of view whose full effect would otherwise be seen by the observer. This aspect, both independently and in conjunction with other aspects, provides a new and unique mode of operation of a liquid crystal controlled mirror.

New embodiments of electronic controls for the liquid crystal controlled mirror are disclosed. In one of these embodiments the functional result is a mirror which will exhibit full brightness (i.e. maximum reflectivity) except that when headlamps or any other high intensity light coming from the rear strikes it, the liquid crystal solution is automatically adjusted in opaqueness to attenuate the high intensity incident light in accordance with a user preset level. Presetting of the user's preferred level may be accomplished by means of adjustment of a suitable device such as a potentiometer.

In another embodiment of electronic control a further light sensor is employed to sense the level of ambient light. The control operates to maintain the reflected light level equal to a multiple of the sensed ambient light level. This multiple can be preset by the user in accordance with his or her preference. An advantage of using the ambient light sensor is to adjust for the inherent sensitivity in the user's eyes which changes with the ambient light level.

The foregoing features, advantages, and benefits of the invention in various aspects, both individually and collectively, along with additional features, advantages, and benefits will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
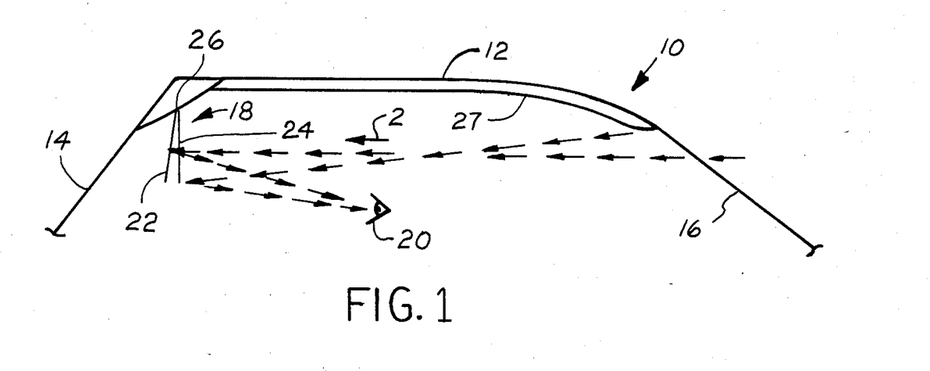
FIG. 1 is a diagrammatic view illustrating the principles of the relationships involved with the liquid crystal controlled mirror of the present invention installed in an automotive vehicle.

FIG. 1 diagrammatically illustrates principles of the present invention in use as a rearview mirror system of an automotive vehicle 10. Specifically FIG. 1 illustrates the upper portion of an automotive vehicle comprising a roof 12, a windshield 14, and a backlight 16. A liquid crystal controlled mirror 18 is disposed within the motor vehicle in the vicinity of the header which joins the windshield to the roof. Mirror 18 provides to the eyes 20 of an occupant a rear field of view, particularly that through backlight 16 toward the rear of the vehicle.

Figure 2:
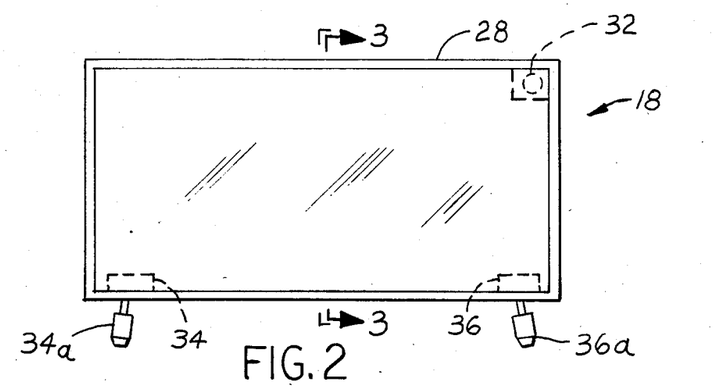
FIG. 2 is a diagrammatic view looking generally in the direction of arrow 2 in FIG. 1, and enlarged.
Figure 3:
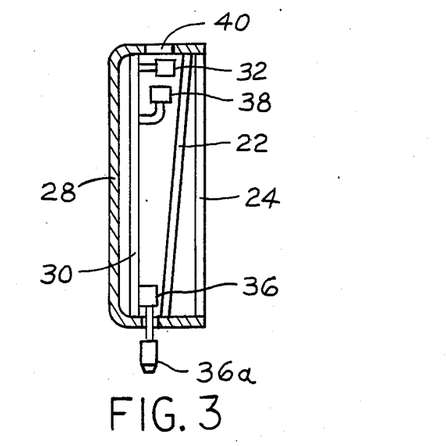
FIG. 3 is a sectional view taken substantially in the direction of arrows 3—3 in FIG. 2.

The liquid crystal controlled mirror 18 is illustrated in somewhat greater detail in FIGS. 2 and 3, but for purposes of illustration of principles of the invention in the usage of FIG. 1, it comprises a mirrored reflecting surface 22 over which is disposed a liquid crystal unit 24. Both mirrored reflecting surface 22 and liquid crystal unit 24 by themselves are conventional. However, in accordance with certain of the principles of implementation of the present invention the liquid crystal unit is disposed in a non-parallel relationship with reflecting surface 22 within their mounting in the mirror housing. Specifically liquid crystal unit 24 is disposed in a plane which is inclined at a small acute angle relative to the plane of reflecting surface 22 as can be seen in FIG. 1 and FIG. 3. While the two do not in fact intersect, there is an imaginary line of intersection as the result of a projection of the planes of the two respective elements. This intersection is shown as a horizontal line running laterally across the vehicle and indicated by the numeral 26. Thus with the arrangement shown in FIG. 1 liquid crystal unit 24 may be considered as tipped slightly upwardly and rearwardly away from the plane of reflecting surface 22 about its upper edge so that along their respective lower edges the two are further spaced apart than along their upper edges.

One intent of a liquid crystal controlled mirror is that its mirrored surface, be it either a separate mirror as shown or a layer deposited as a substrate on the rear face of the liquid crystal unit (not shown), provide the reflected image of the rear field of view to the observer in a true condition. In spite of this intent, the physical construction of the liquid crystal unit and its disposition over the reflecting surface may act as a distorting influence on the image from the reflecting surface because of inherent first surface reflections at the optical interfaces of the liquid crystal unit, and this can be objectionable to the point of unacceptable performance for automotive manufacturers' specifications.

In practice of the present invention where the mirrored surface 22 and the liquid crystal unit 24 are separate parts, this problem can be rendered de minimis or entirely avoided by the inclination of the liquid crystal unit relative to the reflecting surface in the manner shown. In accordance with such an implementation of the invention, reflecting surface 22 is disposed to present to the observer the desired rear field of view through backlight 16. (Of course in many instances somewhat more than only the rear view through the backlight will occur because of the possible variations in mirror size, backlight size, adjustment, and relative position of the eyes of the observer. However the intent remains to provide a view through the backlight to the rear of the vehicle.) Hence, while mirror surface 22 will customarily be adjusted to capture the rear view through backlight 16 for the user, the liquid crystal unit remains inclined to the plane of the reflecting surface 22 such that first surface reflections from the liquid crystal unit's optical interfaces which would be transmitted to the eyes of the observer were the liquid crystal unit parallel to the plane of the reflecting surface are not transmitted to the observer. Rather the arrangement of the liquid crystal unit 24 relative to the observer in the adjusted mirror is such that any first surface reflections to the eyes of the observer come from an inactive area of the vehicle which will under most, or all, circumstances be non-distracting, and in the illustrated embodiment of FIG. 1 this inactive area comprises the headliner 27 which lines the interior of the vehicle's roof.

The exact angle of inclination for any given mirror and vehicle will of course depend upon the geometry involved. Moreover, this in general will not be subject to a precise universal determination because there will be additional factors such as occupant position which will vary from user to user. Hence for a given production design of mirror the angular relationship will undoubtedly be a compromise value. Typical inclinations may occur in the six degree to nine degree range although this is merely exemplary and is not intended to denote a critical limitation.

Further detail of the mirror assembly is shown in FIGS. 2 and 3. Both the reflecting surface 22 and the liquid crystal unit 24 are contained within a suitable housing 28 which can be attached by any suitable means to the vehicle. Typically this may be by a stem on which housing 28 is swiveled for adjustment. Actual details of the housing and of the mounting of the reflecting surface 22 and liquid crystal unit 24 therein are not illustrated since the drawing figures are intended to illustrate general principles of the invention. Preferably the liquid crystal unit overlies the reflecting surface in its entirety.

Housing 28 also serves to contain electronic controls for the liquid crystal unit. By way of example these can be self-contained on an electronic circuit board 30 disposed within the housing behind reflecting surface 22. Specific details of the electronic circuit will be described subsequently in connection with later drawing figures. For purposes of explaining FIGS. 2 and 3 it can be stated that contained on the electronic circuit board in association with the electronic circuitry is a light sensor 32 which is disposed to sense incident light coming from the rear after it has passed through the liquid crystal unit 24. The light sensor 32 is used in the circuit embodiments which are to be explained later, and it is illustrated by way of example as being positioned at the upper right hand corner as viewed in FIG. 2. The location of the sensor 32, however, may be different, depending upon the construction of any given mirror assembly and whether the sensor is required to receive light after the light has passed through the liquid crystal unit, as is the case in the present preferred embodiment.

Also illustrated in association with the mirror assembly are a pair of adjustment devices 34 and 36 which may be controlled by the user occupant. These are illustrated at the lower right hand and lower left hand corners as viewed in FIG. 2. Details of how these are operatively related with the respective circuits will be explained later on. These devices are mounted on circuit board 30, and each comprises a corresponding operator 34a, 36a, which project through a corresponding aperture in the edge of the mirror housing so as to be manually accessible by an occupant for adjusting or setting the respective adjustments. By providing these adjustment controls and light sensor in the mirror housing itself, the unit is rendered suitable for installation both as original equipment manufacture and as an after market accessory. It is possible however that the location of the controls could be moved to other positions within the vehicle if desired.

Certain of the electronic circuit embodiments use a further light sensor 38. This light sensor 38 is illustrated in FIGS. 2 and 3 and being contained within the interior of the mirror assembly, and it is mounted on circuit board 30. The purpose of this further light sensor is to sense the level of ambient light. One way to do this is to enseal the interior of the mirror assembly behind reflecting surface 22 from all ligth except for an aperture 40 through which ambient light can be introduced. The ambient light sensor 38 is disposed to sense this ambient light. The aperture 40 need not be a large one and it is preferably located in the top surface of the mirror housing pointing upwardly, as shown, or alternatively downwardly, with aperture 40 being appropriately relocated. It is believed that in many instances this type of arrangement will provide for reliably detecting the ambient light level.

Figure 4:
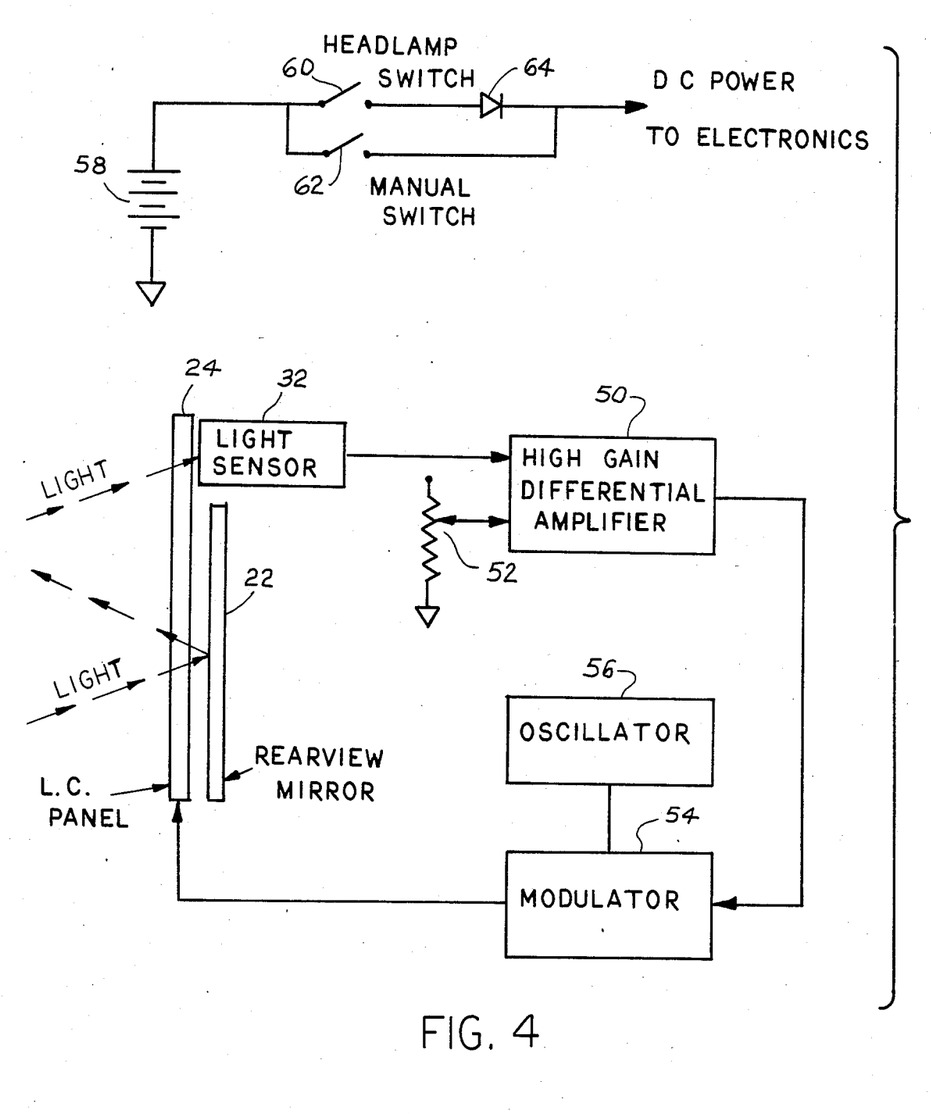
FIG. 4 is an electronic schematic diagram illustrating a first version of electronic control circuit which is used with the liquid crystal controlled mirror.

FIG. 4 illustrates details of a first version of electronic circuit which is used with the mirror assembly. The electronic circuitry comprises conventional electronic circuit components including a high gain differential amplifier 50, a potentiometer 52, a modulator 54, and an oscillator 56 which are cooperatively associated with light sensor 32 and the liquid crystal unit 24 in the manner depicted in the drawing figure. Power for the electronics is supplied from a DC source of electrical potential 58 through a pair of parallel switches. The switches are identified by the reference numerals 60 and 62 respectively. The DC power source may be the vehicle battery or it may be a separate battery or other type of DC power supply within the mirror assembly itself. The manual switch 62 may correspond to the adjustment 36 shown in FIG. 2. Switch 60 is illustrated as the existing headlamp switch on the vehicle. In order to provide isolation of the headlamp switch so as to eliminate any feedback from the mirror a diode 64, poled as shown, is connected in the branch containing the headlamp switch 60. The two swtiches are normally open such that with no power applied to the circuit the liquid crystal unit is in a condition of transparency. This would be the normal daytime mode of operation. If either or both of the switches 60 and 62 are closed, then the circuit is energized so as to become operatively active in adjusting the light transmission charateristics of the liquid crystal unit in response to different intensity light coming from the rear of the vehicle.

The circuit arrangement comprises a closed loop control of the degree of opaqueness of the liquid crystal unit such that the incident light on light sensor 32 is forced to faithfully correspond to a level determined by the setting of potentiometer 52. Hence, as an increasing intensity light is incident on the mirror the control is effective to cause an increased darkening of the liquid crystal unit to result in a corresponding reduction in intensity in the reflected image to the observer. In other words, at nighttime when the headlamps are turned on, the liquid crystal controlled mirror will automatically adjust in response to varying degrees of incident light on it to reduce too intense a light to a level which is preset by the operator in setting potentiometer 52. In this regard potentiometer 52 may correspond to the adjustment 34 illustrated in FIG. 2.

Operation of the manual switch 62 by itself will also cause the mirror to operate in its active mode independent of the condition of headlamp switch 60. At this point it can be further appreciated that the aforementioned feature of implementation of the invention involving the elimination of first surface reflection of angulation of the liquid crystal unit to the mirrored reflecting surface will also improve upon the performance of the mirror because the incident light coming through the backlight of the vehicle, such as the headlamps from a following vehicle, will not be seen by the observer from first surface reflections of the liquid crystal unit's optical interfaces. This contributes to improved performance of the mirror system.

Figure 5:
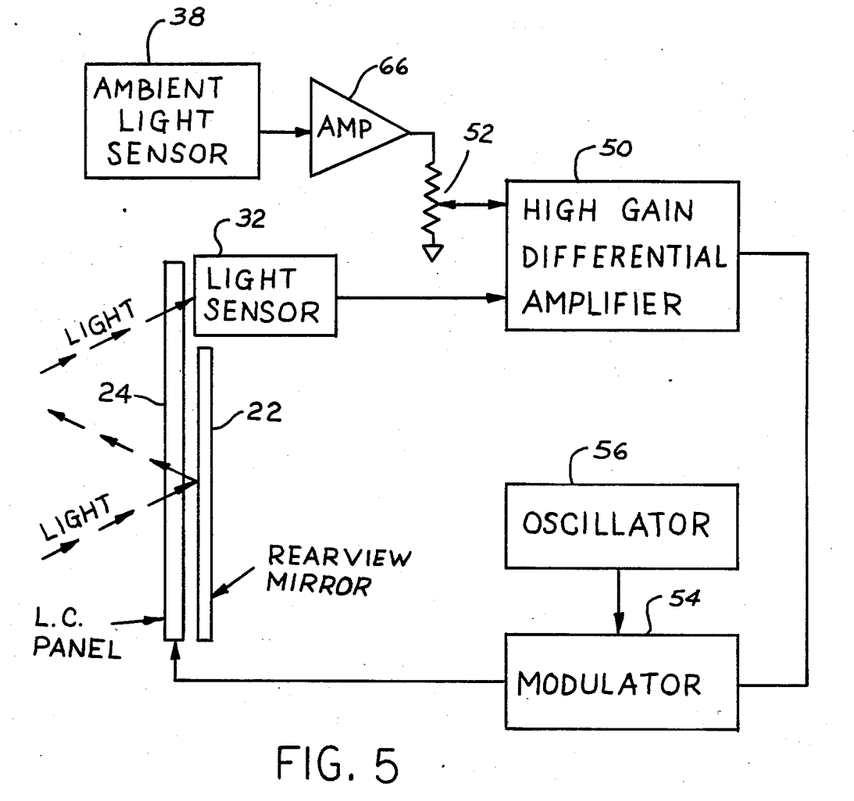
FIG. 5 is an electronic schematic diagram illustrating a second version.

FIG. 5 illustrates a second version of electronics and it is organized in a very similar fashion to the organization of the FIG. 4 embodiment. Like components in FIGS. 4 and 5 are designated by like reference numerals. Instead of providing a fixed reference voltage across the reference potentiometer 52 as was done in FIG. 4, the arrangement of FIG. 5 provides a variable reference voltage level which is a function of ambient light. For this purpose the light sensor 38 for sensing ambient light provides, through an amplifier stage 66, the variable voltage level across potentiometer 52. As in the preceding embodiment the potentiometer is set by the user to a desired setting. The arrangement is such that the input from potentiometer 52 to high gain differential amplifier 50 will be a multiple of the level of ambient light. Typically the multiple will range from 1 to 10 depending upon the particular setting of the potentiometer wiper. The mirror system operates in response to incident light passing through the liquid crystal unit and onto light sensor 32 such that the incident light on light sensor 32 is caused by the closed loop control to correspond to the preset multiple of the existing ambient light level. Because the ambient light level is subject to variation, the amount by which the liquid crystal unit responds in response to light from the rear onto the mirror will also be a function of the ambient light level. This is an especially advantageous arrangement because the light sensor for sensing ambient light generally correlates with the sensitivity of the driver's eyes which also is a function of the ambient light level. With this second version of control, an even further refinement is obtained through the inclusion of the ambient light sensor. As in the first embodiment the user is still permitted to adjust the response through the potentiometer 52. A control switch (not illustrated by FIG. 5) may also be associated with the circuit so that the ambient light sensor can be overridden.

Figure 6:
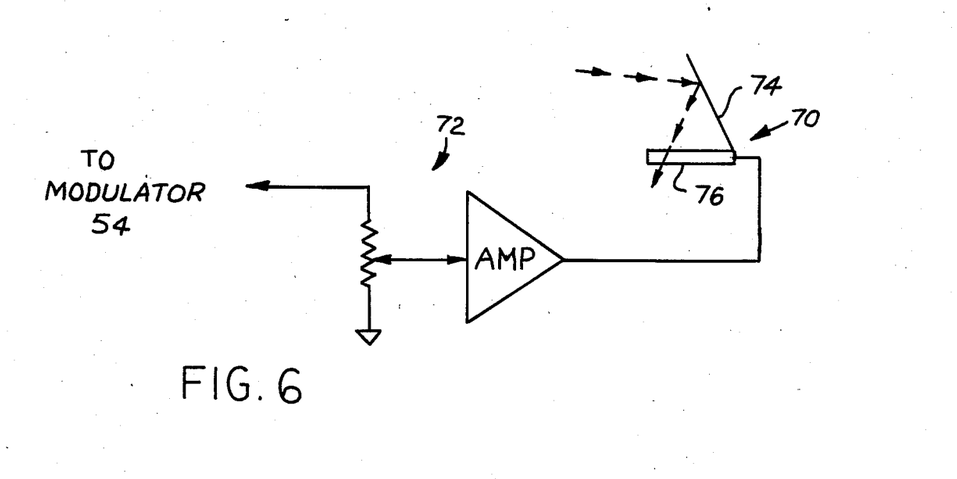
FIG. 6 is a schematic of an optional feature.

FIG. 6 illustrates schematically an optional feature which may be added to the previously described systems. This optional feature comprises a liquid crystal controlled mirror assembly 70 and a control circuit 72. Mirror 70 is an additional mirror positioned on the vehicle to provide an increased field of view to the occupant, and it comprises a reflecting surface 74 and a liquid crystal unit 76. For example it may be a side rearview mirror mounted on the exterior of the vehicle.

Control of mirror 70 is accomplished by supplying the output signal from modulator 54 to control circuit 72. Control circuit 72 operates to control the opaqueness of liquid crystal unit 76 in accordance with the command signal from modulator 54. In this regard the control circuit 72 may be constructed to operate the liquid crystal unit 76 in a manner similar to the manner in which the liquid crystal unit 24 of mirror assembly 18 is controlled, or it may provide an on/off type of switching between opaque and transparent states. The particular mode of operation is determined by the construction and/or adjustment of the control circuit 72.

In the exemplary usage of mirror 70 as a side rearview mirror for an automotive vehicle, the reflecting surface 74 is positioned in relation to the occupant so as to provide a rearview to the side of the vehicle. It has been found advantageous to dispose the liquid crystal unit 76 in a plane which is substantially perpendicular to the line of sight of the occupant looking at the reflecting surface 74. The result is that the liquid crystal unit is disposed at a relatively large acute angle to the plane of the reflecting surface. By way of example, this angle can be in the range of 60 to 90 degrees for a typical automotive vehicle although there is nothing critical about this particular range. The liquid crystal unit may be disposed such that the light from the rear field of view passes through it only after reflection from reflecting surface 74. The control circuit 72 may include a suitable adjustment to adjust and calibrate the manner in which the liquid crystal unit is slaved to the main closed loop control. It will be appreciated however that other constructions are possible for the side rearview mirror 70 and control circuit 72 other than this particular arrangement.

With the provision of the liquid crystal unit 76 it becomes possible to incorporate into said unit an information display for displaying information to the vehicle occupant. Additional circuitry and details of fabrication are required to do this. For example, it would be possible to provide a temperature sensing device in the mirror assembly 70 along with appropriate circuitry whereby a digital readout of the outside temperature is displayed on a suitable portion of the liquid crystal unit 76. Thus the provision of the FIG. 6 arrangement may be desirable for certain applications of the invention.

Figure 7:
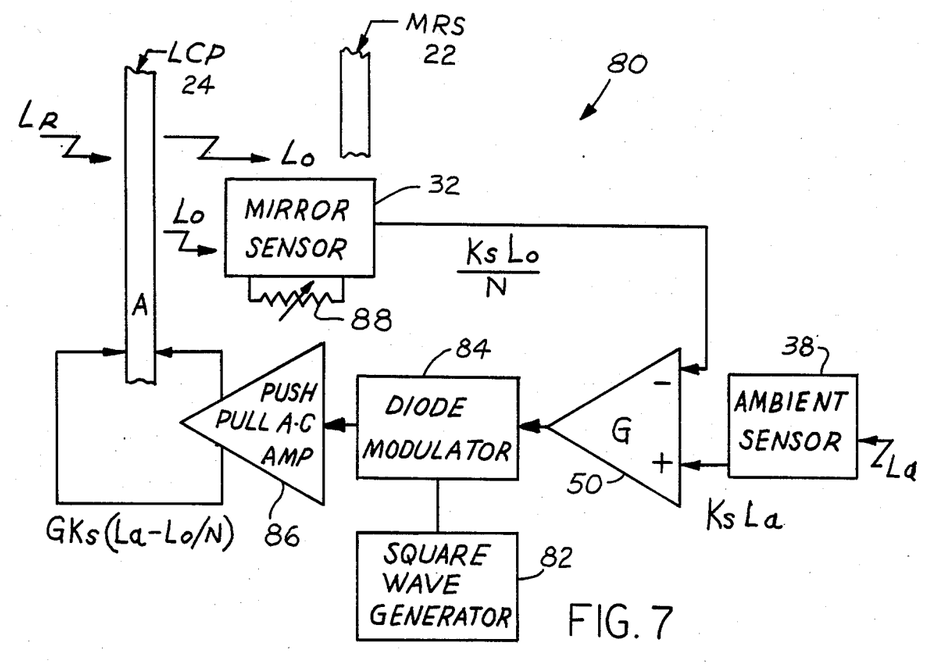
FIG. 7 is an electronic schematic diagram illustrating a third version.

FIG. 7 illustrates a further embodiment of mirror system 80 which bears certain similarities to the system of FIG. 5. The reference numerals 22 and 24 identify the mirrored reflecting surface (MRS) and the liquid crystal panel (LCP) respectively. The reference numerals 32 and 38 identify the two sensors, namely the mirror sensor and the ambient light sensor respectively. The reference numeral 50 designates the high gain differential amplifier.

The embodiment of FIG. 7 further includes a square wave generator circuit 82, a diode modulator circuit 84, and a push-pull AC amplifier circuit 86.

The following symbols are used in connecton with FIG. 7:

$L_R$ = light from rear to LCP24
$L_O$ = light out from LCP24 incident on MRS22
$L_a$ = ambient light
$K_s$ = sensor sensitivity (same for both in this embodiment)
$G$ = gain of differential amplifier 50

A convenient measurement of the light intensities is in foot-candles ($f_c$); the sensor sensitivity in volts per foot-candle (volts/$f_c$); and the gain of differential amplifier 50 is quite high, for example $10^5$.

An adjustment device 88 is cooperatively associated with mirror sensor 32 and is characterized by the parameter N. The illustrated embodiment for adjustment device 88 comprises a manually operable variable resistor (i.e., a potentiometer) for adjusting the mirror sensor's overall gain.

Push-pull AC amplifier 86 has an output which provides a control voltage to LCP24. As illustrated in FIG. 7 this control voltage is applied across electrically conductive, but nonetheless transparent films, which bound the opposite faces of the liquid crystal medium contained within the liquid crystal panel. The degree of opaqueness of the liquid crystal medium is a function of the voltage which is applied by push-pull amplifier 86, and in this regard there exists a range of different degrees of opaqueness correlated with a range of different voltages applied by push-pull amplifier 86.

Mirror sensor 32, amplifier 50, diode modulator 84, push-pull AC amplifier 86, and LCP24 form a closed loop control. The closed loop control functions to maintain a substantially constant value for $L_O$ despite variations in the intensity of the light from the rear $L_R$ over the variable opaqueness range of the liquid crystal medium between a maximum opaqueness and a minimum opaqueness. The minimum opaqueness typically means a maximum transparency, or full brightness, condition while maximum opaqueness typically is referred to as the fully darkened condition. It should therefore be appreciated that the liquid crystal medium of LCP24 can exhibit any of many possible different degrees of opaqueness between these two extremes with the particular degree of opaqueness which exists at any given time being a function of the voltage from push-pull AC amplifier 86.

To illustrate the closed loop operation let it be assumed that there is an increase in intensity of the incident light from the rear $L_R$. Since the light attenuation by LCP24 is already at a particular level, the increase in $L_R$ is manifested by a certain increase in the intensity of $L_O$. This increase in $L_O$ is detected by mirror sensor 32 which causes a corresponding change in the mirror sensor's output as applied to the minus input of high gain amplifier 50. Assuming that the ambient light input to the plus input of amplifier 50 is constant, the change in differential input to the amplifier causes a change in the amplifier's output. This is in turn reflected as a change in the output signal of diode modulator 84 and ultimately as a change in the output voltage of push-pull AC amplifier 86. The direction of the change in the output of amplifier 86 is such as to cause an increase in the degree of opaqueness of the liquid crystal medium of liquid crystal panel 24 which will counteract the increase in the light signal $L_O$ caused by the increase in intensity of the light input $L_R$. Hence in this way the light intensity incident on mirror sensor 32 is regulated to a substantially constant level by the closed loop control.

Within the variable opaquenss range of operation, a decrease in the intensity of the incident light $L_R$ will occasion, via the closed loop control, a corresponding amount of reduction in the opaqueness of the liquid crystal medium of liquid crystal panel 24 so that the magnitude of the output signal $L_O$ on mirror sensor 32 is maintained at the same substantially constant level.

If the magnitude of a change in incident light is sufficiently large, the liquid crystal medium will be driven to either its minimum opaqueness state or its maximum opaqueness state depending upon the direction of the change. In other words, if the incident light is extremely bright, the mirror will be driven to full darkness and in the absence of such light, the mirror will be driven to full brightness.

The closed loop control is also sensitive to the ambient light level $L_a$. In the illustrated embodiment, the signal from ambient light sensor 38 is applied to the plus input of amplifier 50.

If it is assumed that there is a constant intensity light from the rear $L_R$ on the mirror causing the liquid crystal medium to be in a given state of opaqueness somewhere between maximum and minimum, a change in the level of ambient light has the following effect. When the change in ambient light is from brighter to darker, a change in the differential input to amplifier 50 is ultimately reflected as a change in the output of push-pull AC amplifier 86 which causes the opaqueness of the liquid crystal medium panel 24 to become more opaque. With increasing opaqueness, the magnitude of the light intensity $L_O$ is reduced and because of the closed loop feedback of the mirror sensor signal, this has the effect of off-setting the change in the ambient light sensor whereby the control assumes a condition where the liquid crystal medium of LCP24 is more opaque.

By the same token, if the liquid crystal medium is in a state between maximum and minimum opaqueness and there is a change in ambient light from darker to brighter, there is a corresponding change in the output of push-pull AC amplifier 86 which causes the liquid crystal medium to become less opaque. The reduction in opaqueness of the liquid crystal medium causes the light intensity $L_O$ to increase, and this is coupled by the closed loop feedback to amplifier 50 to offset the change from ambient sensor 38 whereby the control stabilizes with the opaqueness of the liquid crystal correspondingly reduced.

According to this aspect of the invention, the degree of brightness of the liquid crystal mirror is functionally related to the level of ambient light such that over a range of ambient light conditions from some minimum level to some maximum level, there exists a corresponding range of mirror brightnesses. Taking into account the effect of changes in incident light from the rear $L_R$, this means that for a given ambient light level within said range of ambient light levels, the closed loop control regulates the brightness of reflected light to the observer in correlation not only with the intensity of incident light from the rear $L_R$, but also with the ambient light level as well. The sensitivity of the ambient light sensor is correlated such that it corresponds to the sensitivity of the human eye to ambient light levels and in this way the brightness of the mirror is regulated automatically to the sensitivity of the typical observer's eyes to ambient lighting conditions.

This is advantageous because it accomplishes the important result that the mirror is allowed to be as bright as possible for any given ambient condition to enhance the view, yet when there are bright lights from the rear, the mirror brightness is adjusted downwardly from the ambient-light-determined level in an amount correlated with the intensity of light from the rear. This is beneficial to the observer in conditions where the bright lights from the rear are causing less than the maximum possible incident brightness on the mirror because the opaqueness is adjusted downwardly enough to attenuate the bright lights from the rear while still allowing a certain brightness for general rearview purposes. As the bright lights from the rear approach maximum possible incident brightness on the mirror, the mirror becomes increasingly darker until it reaches full darkness. Even at full darkness there is some very limited visibility, in other words the mirror preferably does not go blank.

For an example of the interaction of the ambient light correlation effect in conjunction with the closed loop control in response to incident light from the rear, the following situations may be considered.

In full daylight, bright headlights from the rear will not impose any serious consequences on the ability of the driver to view either the rear field of view through the mirror or the forward field of view through the windshield. In this situation of full ambient light, the mirror will typically be in its maximum degree of brightness regardless of whether bright headlights are incident from the rear or not.

However as dusk approaches, the presence of bright headlights from the rear begins to have increasingly significant consequences on the ability of the driver to view the forward field of view through the windshield. Such conditions however do not warrant automatically placing the mirror in its maximum opaqueness condition because that would prevent the driver from seeing portions of the rear field of view which might be of interest and still potentially visible in the absence of bright lights from the rear.

The present invention takes this into account because it attenuates the mirror brightness to a level correlated with ambient light and hence sensitivity of the driver's eyes. In other words, the driver's eyes at approaching dusk will be more sensitive to bright light from the rear than in full daylight but not as fully sensitive as they would be at full darkness. Therefore at dusk in response to bright headlights from the rear, the mirror brightness is attenuated to a level corresponding to the ambient light level.

When ambient conditions have reached a point which would be deemed nighttime, any change in LCP 24 is dictated essentially entirely by mirror sensor 32. Stated another way, at nighttime conditions, the ambient sensor output typically does not change, and therefore the mirror sensor can be deemed to exercise exclusive control over the closed loop operation.

Going in the other direction, from nighttime to daytime conditions, the opposite effect occurs. As general ambient lighting conditions become brighter with approaching dawn, the effect of bright headlights from the rear becomes less and less on the driver's vision. Accordingly, over this range, ambient sensor once again becomes interactive with the mirror sensor in the manner described earlier. Under full daylight conditions, bright headlights from the rear may be deemed to have no significant effect on the driver and therefore at this extreme, the ambient light sensor can be deemed to exercise essentially exclusive control causing full mirror brightness. Thus, it can be seen that the ambient sensor has a range of interactive effect with the closed loop control over a range of ambient lighting conditions between full daylight and full darkness.

That the intensity of light from LCP 24 $L_O$ is correlated in substantial proportion to the ambient light level over this range is illustrated by the following mathematical relationships which are presented for the configuration of FIG. 7 where A = light attenuation by LCP 24. The light attenuation A is a function of the physical characteristics of the LCP and the voltage applied by push-pull AC amplifier 86. Let the characteristic of the LCP panel 24 be identified by the designation $K_{LCP}$ and let the voltage output from push-pull AC amplifier 86 be identified by the symbol $E_{AC}$. p Therefore $A = K_{LCP} \times E_{AC}$. The attenuation A also = $L_O/L_R$. With these relationships and the mathematics of the closed loop control developed by application of conventional closed loop principles, the following relationship exists:

$$L_O = \frac{L_R K_{LCP} G K_s L_a}{1 + L_R K_{LCP} G K_s / N}$$

By making $L_R K_{LCP} G K_s / N$ much much greater than unity this reduces to $L_O = N L_a$ where N is a constant.

Figure 8:
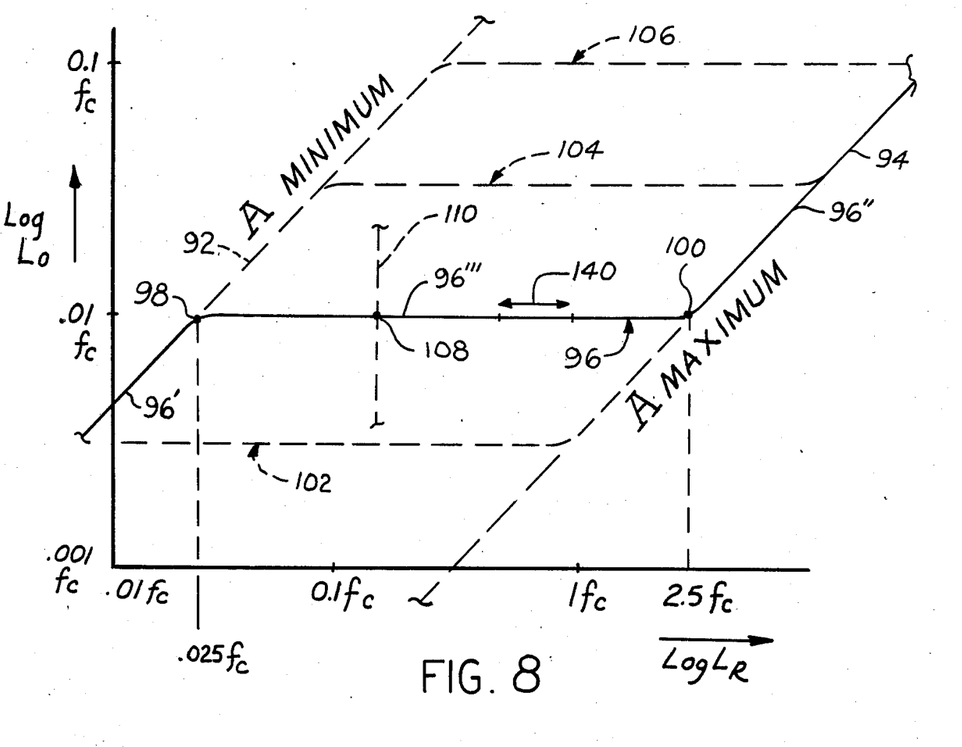
FIG. 8 is a graph plot useful in explaining the operation of the schematic of FIG. 7.

Representative relationships are graphically protrayed in FIG. 8. FIG. 8 is a graph plot whose horizontal axis represents the logarithm of $L_R$ and whose vertical axis represents the logarithm of $L_O$. The units of measurement along each of the two axes are in foot-candles.

An inclined line 92 defines the minimum light attenuation by LCP24, in other words maximum mirror brightness. Another inclined line 94 defines the maximum light attenuation, or the fully darkened condition of the mirror. These two lines 92, 94 define boundaries for a zone in which the degree of opaqueness is somewhere between maximum and minimum. From consideration of the characteristics of this zone, it will be appreciated that the LCP always introduces some attenuation, even at maximum brightness, and that the incident light from the rear must always have an intensity exceeding the ambient light before the mirror begins to darken in response to light from the rear. Preferably the light from the rear must exceed the ambient light by a factor of about two, and this factor of two corresponds roughly to the minimum change which the human sensory system can detect. Hence, the system of the invention is well adapted to human physiology.

For each level of ambient light within the range over which the ambient light sensor is interactive with the closed loop control, there exists a corresponding characteristic line. (FIG. 8 shows four particular ones.) In other words there exists a whole family of such graph lines, each correlated with a particular ambient light level.

The solid line graph plot line 96 in FIG. 8 illustrates a representative one, for a value of ambient light corresponding to 0.01 foot-candle. This would correspond to approximately a full moon at night. Graph plot 96 comprises a first segment 96' which is coincident with a portion of line 92, and a second segment 96'' coincident with a portion of line 94. A third segment 96''' represents a transition between segments 96' and 96'', and for purposes of illustration, this segment 96''' is illustrated as being parallel to the horizontal axis.

In actual practice the actual graph plot line shape depends on the design of the control electronics and the characteristics of the liquid crystal so that there may be departure from the particular shapes depicted by FIG. 8. In general however any typical characteristic graph plot line will have a segment corresponding to the segment 96' coincident with a portion of line 92, a segment corresponding to segment 96'' coincident with line 94, and an intermediate third segment corresponding to 96''' even if the intermediate segment does not have a substantially linear shape parallel to the horizontal axis.

For convenience in explanation let the reference numeral 98 designate the junction of segment 96' and segment 96''', and let the reference numeral 100 designate the junction of segment 96''' and segment 96''. These two points are referenced to values along the two axes as indicated by broken lines. For ambient light intensity of 0.01 foot-candle the closed loop control will operate in the following fashion.

For light from the rear intensity $L_R$ below 0.025 foot-candle the closed loop control is in a condition where the liquid crystal medium is a minimum opaqueness; above 2.5 foot-candles, the liquid crystal medium is at maximum opaqueness. Between the range 0.025 foot-candle and 2.5 foot-candles of incident light from the rear, the control acts to hold the light output $L_O$ from the LCP to a substantially constant level. FIG. 8 therefore graphically portrays the earlier description given with respect to FIG. 7.

The effect of changing the parameter N serves in effect to shift the horizontal segment corresponding to segment 96''' along the vertical axis. This is portrayed by the three broken line graph plots 102, 104, 106 corresponding respectively to 0.003 foot-candles, 0.03 foot-candles, and 0.1 foot-candles of ambient light.

This adjustment is performed by adjustment of the parameter N associated with mirror sensor 32, i.e. by adjusting the variable resistance.

The effect of change in ambient light on the control can be seen with reference of FIG. 8 in the following manner. Let it be assumed that the parameter N has been set to a constant value and that the control is operating at the point identified by the reference numeral 108. Let it be further assumed that the incident light from the rear is constant.

Now for an increase in ambient light level, the operating point will move from 108 upwardly along the vertical broken line 110 until the change in ambient light level is fully compensated for by a corresponding increase in light transmission of the LCP. If the amount of change cannot be fully compensated for, the operating point eventually intersects line 92 and thereafter the final operating point will be somewhere along line 92 above point 98. The liquid crystal panel assumes the condition of maximum transparency once the operating point is on line 92.

If the operating point is at 108 and the change in ambient light is now toward a darker condition, the control will respond whereby the operating point moves downwardly along vertical line 110. The amount of movement will correspond to the change in intensity, but if the change is sufficiently great the operating point will intersect line 94 corresponding to the liquid crystal panel assuming its maximum opaqueness condition.

From consideration then of the graph plot in relation to the drawing figures and the foregoing description, it will be appreciated that there are a multitude of potential operating points on the graph plot bounded between maximum and minimum opaqueness lines 92, 94 and which are correlated both with the mirror sensitivity parameter N and the ambient light measurement $L_a$. This graph plot characterizes in a general way the new and unique operating characteristics which are achieved with the present invention by graphically depicting the several interactive relationships involved.

Firstly there is an interactive relationship of ambient light on the operating point; secondly there is an interactive relationship of the adjustment of the parameter N on the operating point, and both of these are reflected as vertical movement of the operating point within the zone.

The third interactive relationship is due to change in incident light from the rear which is reflected as horizontal change of the operating point within the zone between maximum and minimum opaqueness lines 92, 94.

For convenience in the foregoing description, the effect of change in only one parameter at a time has been discussed. It will however be appreciated that change in plural parameters may occur contemporaneously whereby a change in the operating point may be represented by combined horizontal and vertical movements on the graph.

Figure 9:
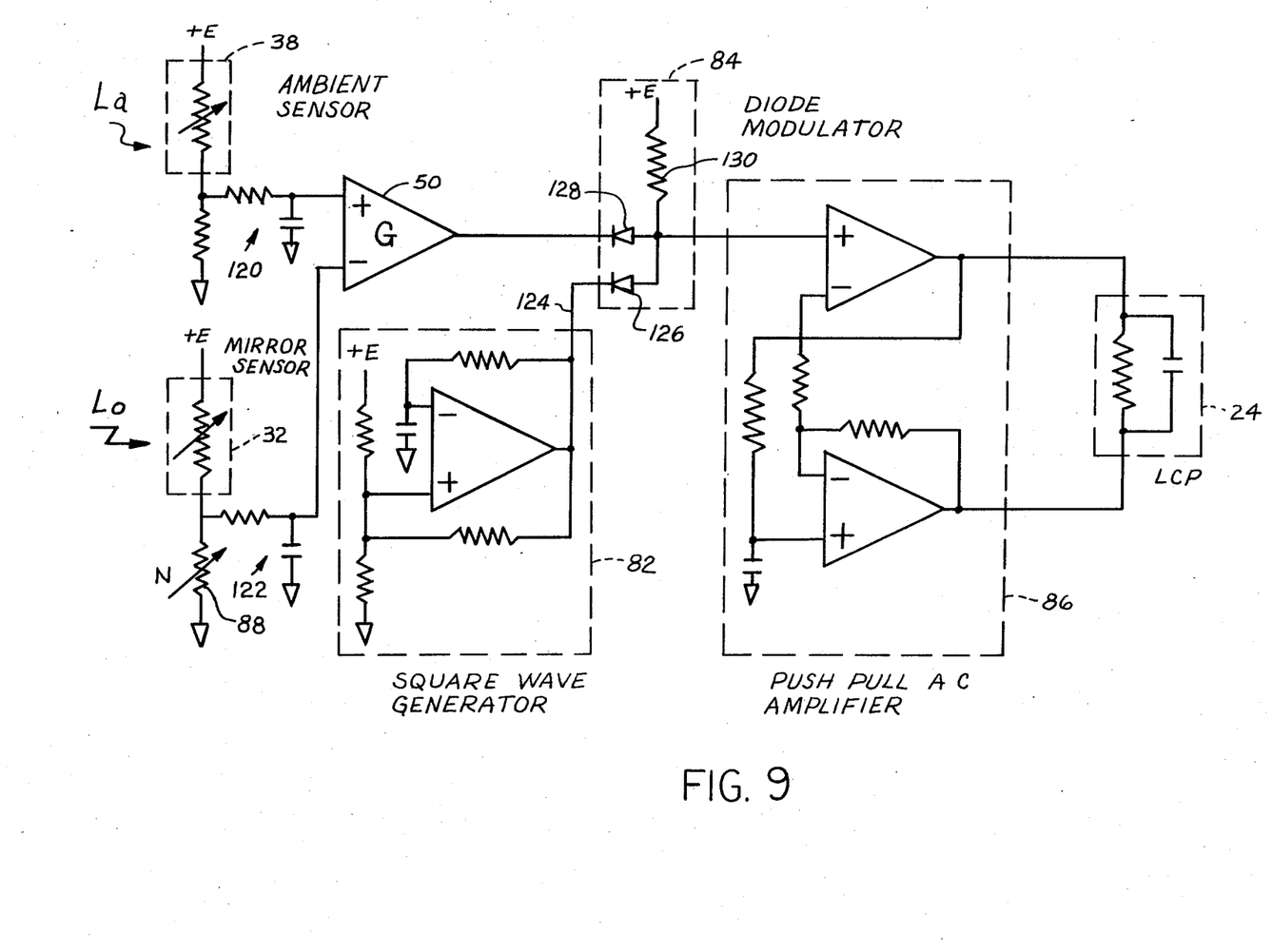
FIG. 9 is a detailed schematic of FIG. 7.

FIG. 9 illustrates a more detailed schematic diagram of FIG. 7. Ambient sensor 38 is shown as a variable resistance connected in a series resistance circuit operatively coupled to one input (the plus input) of amplifier 50. A low pass filter 120 preferably operatively couples the junction of the series circuit with the amplifier input to stabilize the closed loop by preventing certain momentary ambient light changes from changing the sensitivity of the closed loop. For example, if the ambient light sensor is facing upwardly as depicted in FIG. 3, and the vehicle is traveling along a lighted road at night whereby the sensor successively passes under widely separated street lights, the momentary passage underneath a street light will not be sufficient to have an influence on the otherwise generally prevailing nighttime conditions being sensed. However if the vehicle were stopped at night under a bright light or the lights were fairly close together, then the sensed ambient light could indicate other than a full nighttime condition so that the mirror would revert to a somewhat brighter state. With the vehicle being stopped under a bright light this should not pose a problem because the vehicle is stopped. Even under a nighttime condition where artificial light conditions are present, a perceived ambient brightness somewhat brighter than at full nighttime should not be a problem because the driver's eyes may be somewhat less sensitive to bright lights from the rear under the prevailing artificial light conditions than they might otherwise be under full nighttime darkness.

Mirror sensor 32 is connected in an input circuit operatively coupled to the other (minus) input of amplifier 50. The disclosed embodiment of mirror sensor has a variable resistance characteristic. The adjustable device 88 is cooperatively associated with mirror sensor 32 and the two are connected in a series circuit across the fixed reference voltage E, and their junction provides the signal which is passed through a low pass filter 122 before it reaches the minus input of amplifier 50. The characteristic of low pass filter 122 is preferably such that it does not require nearly as long a change in the signal from the mirror sensor to effect amplifier 50 as did low pass filter 120 for the ambient sensor signal. This is desirable because fast response of the mirror to the appearance of bright lights from the rear is usually desired.

Diode modulator 84 serves to modulate the signal from amplifier 50 with a signal from square wave generator 82. Square wave generator 82 is a conventional circuit which provides a square wave signal at an output line 124. This signal is applied to the cathode of a diode 126 and the cathode of another diode 128 receives the output signal from amplifier 50.

The anodes of the two diodes 126 and 128 are in common and pulled up through a resistor 130 to the reference power supply E. They also provide a signal input to push-pull amplifier 86.

Push-pull amplifier 86 is of a conventional design as illustrated, and it serves the purpose of amplifying the square waveform for operating LCP 24. The diode modulator serves to provide a modulated signal input to push-pull amplifier 86 which has a characteristic corresponding to the conditions sensed by the two sensors 32, 38 and setting of device 88. This produces a corresponding square waveform for energization of the liquid crystal panel.

The particular type of waveform which is most appropriate for energizing any liquid crystal panel depends upon the specific construction of that panel. As known in the art, there are a range of different materials suitable for the liquid crystals and the use of the term liquid crystals is in a comprehensive sense of include, without limitation, dichroics and nematics. A generic term which appears to have recognition in the art for a liquid crystal panel is an electrically controlled optical transmission plate.

The particular characteristics for the specific design of the various circuit components are made in accordance with conventional engineering calculations to provide a waveform whose characteristics are correlated with the variable inputs 24, 32, and 88 in view of the particular design of the liquid crystal panel.

While it is to be anticipated that a liquid crystal material will have a characteristic corresponding substantially to that described in connection with FIG. 8, certain crystals do not possess such an idealized characteristic. Indeed some may even have an undesired characteristic resulting in an outward appearance of frosting in response to changes in the inputs. Often these frosted areas are in limited zones and it has been found possible to eliminate their effect by incorporation of appropriate provisions in the circuit.

For example if with reference to FIG. 8 a frosted zone might be deemed to occur within the region identified by the reference numeral 140, a hysteresis circuit incorporated into the control circuit and having a hysteresis range correlated with this range of frosting, will prevent the mirror from operating within this range. For example it is possible in the case of FIG. 7 to insert such a hysteresis circuit between the output of amplifier 50 and the input of diode modulator 84. Once again, the appropriate selection of circuit parameters for the hysteresis circuit is made in accordance with conventional design practices to correlate with the range of frosting. The width of the hysteresis band is made to correspond to the width of the undesired frosting zone. When the control would issue a command which would correspond to an operating point within the zone, the hysteresis circuit prevents such an operating point to be obtained because a change in the input signal to the hysteresis circuit must be sufficiently great to step over the zone before there is a corresponding change in output.

In the case of the circuit of FIG. 7, the adjustable device 88 may correspond to one of the adjustable elements one the mirror assembly, 34 or 36. This allows the driver to set the sensitivity to his own preference. A difference in FIG. 7 over that of FIG. 5 is that the adjustment is associated with the mirror sensor 32 in FIG. 7. However, because of the cooperative interaction, there is an ultimate end effect on the control in the same manner as the adjustable device of FIG. 5 had an effect on the control.

From consideration of the characteristics illustrated by FIG. 8, it will be appreciated that the invention allows the full range of the optical transmission plate to be utilized for different settings of adjustment device 88 and incident ambient light sensed by ambient light sensor 38. In other words, for a given setting of N and a given intensity of incident light, operation can occur along the full extent of the corresponding horizontal segment such as the segment 96'''. The control adjusts the optical transmission plate to the appropriate value between the lines 92 and 94 for an incident brightness lying within the corresponding range. The control may be considered to select a nominal operating point about which the full range of optical transmission capabilities of the optical transmission plate can be utilized.

It will also be observed that for any given characteristic curve, the span between the two lines 92 and 94 is substantially the same. This means that when there is an adjustment causing the operating point to move from one characteristic curve to another, the full range of the optical transmission plate can still be utilized for closed-loop control over the corresponding new range. Thus the capabilities of a liquid crystal controlled rearview mirror system are significantly enhanced by the present invention. For instance, when there is an adjustment corresponding to a downward movement of the operating point from one horizontal segment to another, the span over which the optical transmission plate can be adjusted is merely moved lower along the range of brightnesses as measured along the horizontal axis. Conversely when the operating point in effect moves upwardly, the span also moves upwardly, but for all such adjustments, the spans are substantially the same.

Each of the several embodiments of electronic circuits disclosed herein can be embodied in an electronic circuit board assembly assembled into the mirror assembly as illustrated in FIG. 3. Such a construction is advantageously compact. For after-market usage, provisions can be made for incorporating a battery into the mirror assembly so that the power supply is fully self-contained. Alternatively, it would be possible to provide power from an external source and conduct the power via wires and suitable connectors with the circuitry on the electronic circuit board assembly. For example such wiring could be incorporated as part of a wiring harness in a new automobile and provided with a connector plug which plugs into a mating plug which extends from the circuit board assembly 30 through a suitable hole in housing 28.

Principles of the invention are not limited by the particular construction of the optical transmission plate nor the particular medium which is utilized for the optical properties. As explained above, the mirrored reflecting surface 22 and the LCP 24 can be separate parts which are assembled together into the mirror assembly. In such a construction the mirrored surface 22 is a standard glass mirror having a silvered reflecting surface. The optical transmission plate comprises a pair of opposed glass plates capturing the optical medium between them as a very thin film. Suitable electrode structure is incorporated in the construction according to conventional fabricating techniques. Such a construction may or may not use polarizers depending upon the nature of the optical medium.

An alternate construction may comprise the reflecting surface being an integral part of the optical transmission plate assembly. In this construction the optical transmission plate assembly is still considered to overlie the reflecting surface, or stated another way it is disposed in the optical path between the field of view and the observer.

Some particular optical materials have electro-optical properties which render the optical transmission plate of maximum transparency when no voltage is being applied to it and cause it to increase in opaqueness as increasing voltage is applied. Other optical materials have an inverse property whereby when no voltage is being applied to the optical transmission plate, it is of maximum opaqueness and decreases in opaqueness with increasing application of voltage. The principles of the present invention are applicable to both types of mediums. In general it is deemed preferable to utilize a medium which is normally fully light transmissive when no voltage is applied to the optical transmission plate so that in event of loss of power, for whatever reason, the mirror can assume maximum brightness. This is preferred since it may be deemed more important for the mirror to be useable in daylight despite the fact that it will not be able to reduce glare under nighttime conditions.

The disclosed arrangement of the mirror assembly herein contains a number of inventive principles. Certain of the inventive principles may be practiced in rearview mirror systems in which the optical medium or optical transmission plate does not overlie the mirrored reflecting surface as in the mirror assembly herein disclosed. In other words, in the disclosed mirror assembly, the optical medium or optical transmission plate is disposed both in that portion of the optical path for light from the field of view to the reflecting surface and in that portion of the optical path from the reflecting surface to the observer. Certain principles of the invention are applicable to rearview mirror systems in which the optical medium or optical transmission plate is disposed only in the optical path between the field of view and the reflecting surface or only in the optical path between the reflecting surface and the observer.

The preferred embodiment disclosed herein also comprises the mirror sensor 32 being disposed to sense incident light on the mirrored reflecting surface after that light has been attenuated by the optical transmission plate. Such a requirement is not essential for practice of certain principles of the invention and the mirror sensor can be disposed to sense the incident light from the rear field of view as it is incident upon the mirror assembly. In the mirror assembly illustrated by FIGS. 2 and 3, the upper right hand corner of the mirrored reflecting surface 22 is left transparent so that the sensor 32 can sense the incident light on the reflecting surface 22 after it has been attenuated by LCP 24. In the example described where the sensor 32 is arranged to sense light incident on the mirror assembly, the upper right hand corners of both the mirrored surface 24 and the LCP 24 are left clear, or alternatively cut away.

While a preferred embodiment of the invention has been disclosed, it will be appreciated that principles are applicable to other embodiments as defined by the scope of the following claims.

What is claimed is:

1. A variable brightness mirror assembly comprising a reflecting surface for reflecting to an observer a field of view which is incident on the mirror assembly and an electrically controlled optical transmission plate disposed over said reflecting surface, said optical transmission plate being operable to any of a number of different states of light transmission, reference establishing means for establishing any desired level of a reference signal over a range of possible reference signal levels corresponding to a range of different brightnesses for light from the field of view which is incident on said reflecting surface, sensor means disposed to provide a detection signal related to the brightness of the incident field of view on the mirror assembly, and control means coupling said sensor means and said reference establishing means in electrical control of said optical transmission plate for causing the brightness of the light from the field of view which is incident on said reflecting surface to be closed-loop regulated to a particular level established by said desired reference signal for any intensity of brightness of the field of view incident on the mirror assembly within a range of different intensities of incident brightness on the mirror assembly, said control means comprising an amplifier stage for causing said optical transmission plate to operate to a state of light transmission which is correlated with both the level of said desired reference signal and the level of said detection signal so as to render the brightness of the field of view incident on said reflecting surface substantially insensitive to change in the incident brightness on the mirror assembly over said range of different intensities of incident brightness for any given level of said desired reference signal over said range of possible reference signal levels while allowing the brightness which is incident on said reflecting surface to be set to any desired brightness within said range of different brightnesses by operation of said reference establishing means, including observer-settable means settable by the observer to set a desired brightness of light from the field of view which is incident on said reflecting surface and causing said control means to closed-loop regulate the light transmission of said optical transmission plate in correlation with the setting of said observer-settable means, and also including an ambient light sensor means for sensing the prevailing ambient light level and causing said control means to closed-loop regulate the light transmission of said optical transmission plate also in correlation with changes in sensitivity of the observer's eyes due to changes in ambient light level, said observer-settable means, said first-mentioned sensor means, and said ambient light sensor means all being in an input circuit relationship to said amplifier stage so as to have an interactive effect on said amplifier stage in performing the closed-loop regulation of said optical transmission plate.

2. A variable brightness mirror assembly as set forth in claim 1 in which said sensor means is disposed behind said optical transmission plate so as to provide said detection signal on the basis of the brightness of the incident field of view as attenuated by the light transmission of said optical transmission plate.

3. A variable brightness mirror assembly as set forth in claim 1 in which said observer-settable means settable by the observer comprises a potentiometer across which a fixed voltage supply is applied, said potentiometer comprising a wiper which is adjustable to supply a desired percentage of said fixed voltage supply as the desired reference signal level.

4. A variable brightness mirror assembly as set forth in claim 1 in which said observer-settable means settable by the observer comprises a potentiometer across which a supply voltage is applied, said potentiometer comprising a wiper which is adjustable to supply a signal which is a percentage of said supply voltage as the desired reference signal level, said supply voltage across said potentiometer being variable.

5. A variable brightness mirror assembly as set forth in claim 4 in which said ambient light sensor means is coupled with said potentiometer to vary the supply voltage across the potentiometer as a function of ambient light.

6. A variable brightness mirror assembly as set forth in claim 1 in which said optical transmission plate and said reflecting surface are so arranged that the reflected field of view also passes through said optical transmission plate.

7. A variable brightness mirror assembly as set forth in claim 1 in which said optical transmission plate and said reflecting surface are disposed in respective planes which are at a small acute angle to each other about a generally horizontal axis and both said optical transmission plate and reflecting surface are below said generally horizontal axis.

8. A variable brightness mirror assembly as set forth in claim 1 in which said mirror assembly includes a housing containing said reflecting surface, said optical transmission plate, said reference establishing means, said sensor means, and said control means.

9. A variable brightness mirror assembly as set forth in claim 8, said housing also containing a battery for supplying all the required power for said control means to control the operation of said optical transmission plate.

10. A variable brightness mirror assembly as set forth in claim 8, said control means comprising an electronic circuit board assembly containing electronic control circuitry, including said amplifier stage, for controlling operation of said optical transmission plate in accordance with said desired reference signal level and said detection signal, said first-mentioned sensor means comprising a photodetector mounted on said circuit board assembly.

11. A variable brightness mirror assembly as set forth in claim 10, said ambient light sensor means comprising a further photodetector mounted on said circuit board assembly.

12. A variable brightness mirror assembly as set forth in claim 11, in which said further photodetector causes said control means to require a certain minimum change in ambient light level before said control means makes a corresponding adjustment of the light transmission of said optical transmission plate.

13. A variable brightness mirror assembly as set forth in claim 11, including a manually operable device on said circuit board assembly having an operator which is accessible to the observer for effecting an adjustment of said manually operable device, said manually operable device having a cooperative association in said mirror assembly for influencing the relative cooperative relationship of said observer-settable means, said first-mentioned sensor means, and said ambient light sensor means in their interactive effect on said amplifier stage.

14. A variable brightness mirror assembly as set forth in claim 10, said amplifier stage comprising a high gain differential amplifier, the output of said high gain differential amplifier being supplied as an input to a diode modulator circuit to modulate the high gain differential amplifier output with a square wave signal from a square wave generator circuit and provide a modulated signal output as an input to a push-pull AC amplifier circuit which drives the optical transmission plate.

15. A variable brightness mirror assembly as set forth in claim 14 including an adjustment device on said circuit board assembly and cooperatively associated with said photodetector for adjusting the contribution of said photodetector in its interactive effect with said observer-settable means and said first-mentioned sensor means on said amplifier stage.

16. A variable brightness mirror assembly as set forth in claim 15, in which said adjustment device comprises an operator which is accessible to the observer for enabling the observer to make a manual adjustment of said device.

17. A variable brightness mirror assembly comprising a reflecting surface for reflecting to an observer a field of view which is incident on the mirror assembly and an electrically controlled optical transmission plate disposed over said reflecting surface, said optical transmission plate being operable to any of a number of different states of light transmission, reference establishing means for establishing any desired level of a reference signal over a range of possible reference signal levels corresponding to a range of different brightnesses for light from the field of view which is incident on said reflecting surface, sensor means disposed to provide a detection signal related to the brightness of the incident field of view on the mirror assembly, and control means coupling said sensor means and said reference establishing means in electrical control of said optical transmission plate for causing the brightness of the light from the field of view which is incident on said reflecting surface to be closed-loop regulated to a particular level established by said desired reference signal for any intensity of brightness of the field of view incident on the mirror assembly within a range of different intensities of incident brightness on the mirror assembly, said control means comprising means for causing said optical transmission plate to operate to a state of light transmission which is correlated with both the level of said desired reference signal and the level of said detection signal so as to render the brightness of the field of view incident on said reflecting surface substantially insensitive to change in the incident brightness on the mirror assembly over said range of different intensities of incident brightness for any given level of said desired reference signal while allowing the brightness which is incident on said reflecting surface to be set to any desired brightness within said range of different brightnesses by operation of said reference establishing means, said control means comprising an electronic control circuit comprising a high gain differential amplifier circuit receiving said reference signal and said detected signal as inputs and providing an output signal which is correlated with the differential of said reference signal and said detected signal.

18. A variable brightness mirror assembly as set forth in claim 17, said electronic control circuit further including a diode modulator circuit receiving the output of said amplifier circuit and modulating same with a square wave signal from a square wave generator circuit to provide a modulated signal output as an input to a push-pull AC amplifier circuit which drives the optical transmission plate.

19. A variable brightness mirror assembly as set forth in claim 17, said reference establishing means comprising ambient light sensor means for sensing prevailing ambient light and providing said desired reference signal in correlation with the level of prevailing ambient light.

20. A variable brightness mirror assembly as set forth in claim 19, including adjustment means for adjusting the gain of said first-mentioned sensor means.

21. A variable brightness mirror assembly as set forth in claim 20, in which said adjustment means comprises an adjustable device having an operator accessible by the observer for adjusting the gain of said adjustable device.

22. A variable brightness mirror assembly as set forth in claim 19 in which said amplifier circuit has a gain G, said ambient light sensor means has a gain $K_s/N$, $L_R$ is the intensity of the brightness of incident light from the field of view, $L_O$ is the intensity of light incident on the reflecting surface after having passed through the optical transmission plate, $L_a$ is the intensity of ambient light on said ambient light sensor, $K_{LCP}$ is a characteristic of the optical transmission plate, and said reference establishing means, said first-mentioned sensor means, said amplifier circuit and said optical transmission plate are organized and arranged such that the following relationships exist:

$$L_O = \frac{L_R K_{LC} PGK_s L_a}{1 + L_R K_{LC} PGK_s/N} ; \text{ and}$$

$$L_R K_{LC} PGK_s/N >> 1; \text{ whereby } L_O = NL_a.$$

23. A variable brightness mirror assembly as set forth in claim 22 in which the parameter N is variable by an adjustment cooperatively associated with said first-mentioned sensor means.

24. A variable brightness mirror assembly as set forth in claim 23 in which said adjustment means comprises an adjustment device having an operator accessible to the observer for allowing the observer to manually adjust sensitivity of the control means.

25. A variable brightness rearview mirror system comprising a reflecting surface for reflecting a field of view to an observer, an electrically controlled optical transmission plate disposed in the optical path between the field of view and the observer, said optical transmission plate being operable to any of a number of different states of light transmission, sensor means to provide a detection signal sensitive to change in brightness of the field of view incident on the mirror system, control means coupling said sensor means in electrical control of said optical transmission plate for causing the reflected brightness of the field of view seen by the observer to be closed-loop regulated to compensate for changes in the incident brightness, and adjustable correlation means for adjustably correlating the regulated reflected brightness in a manner correlated with changes in the sensitivity of the observer's eyes as a function of ambient light level, said adjustable correlation means comprising ambient light sensor means disposed to sense prevailing ambient light from a direction other than the field of view and provide a signal correlated with prevailing ambient light level over a range of different ambient light levels, and means coupling said ambient light sensor means and said first-mentioned sensor in differential input to a high gain amplifier circuit of said control means so that said amplifier circuit provides an output correlated with the differential between signals provided by the two sensor means, and means coupling the output of said amplifier circuit with said optical transmission plate for causing the latter to be operated to a state determined by the amplifier circuit output.

26. A variable brightness rearview mirror assembly as set forth in claim 25 in which said first-mentioned sensor means is disposed behind said optical transmission plate so as to provide said detection signal on the basis of the brightness of the incident field of view as attenuated by the light transmission of said optical transmission plate.

27. A variable brightness rearview mirror system as set forth in claim 25 in which said adjustable correlation means further includes adjustment means cooperatively associated with said ambient light sensor means to provide for adjustment of the gain of said ambient light sensor means.

28. A variable brightness rearview mirror system as set forth in claim 25 including adjustment means associated with said first-mentioned sensor means to provide for adjustment of the gain of said first-mentioned sensor means.

29. A variable brightness rearview mirror assembly as set forth in claim 25 in which said means coupling the output of said amplifier circuit with said optical transmission plate comprises a diode modulator circuit having one input coupled to the output of said amplifier circuit, a square wave generator circuit providing a square wave signal to another input of said diode modulator circuit, said diode modulator circuit modulating the signal received from said amplifier circuit with the square wave signal provided by said square wave generator circuit to yield a modulated signal, and a push-pull AC amplifier circuit having an input receiving the modulated signal from said diode modulator circuit, and said push-pull AC amplifier circuit having an output which drives the optical transmission plate.

30. A variable brightness rearview mirror system as set forth in claim 25 in which said ambient light sensor means is arranged to sense ambient light from other than the field of view, said control means including means associated with said ambient light sensor means for requiring a certain minimum change in ambient light level before said control means makes a corresponding adjustment of the light transmission of said optical transmission plate.

31. A variable brightness rearview mirror system as set forth in claim 25 in which said amplifier circuit, said ambient light sensor means, and said first-mentioned sensor means are characterized by respective gains and in which said sensor means, said amplifier circuit and said control means are organized and arranged such that a certain change in ambient light level effectuates a substantially proportional change in the brightness which is incident on both the reflecting surface and the first-mentioned sensor means.

32. A variable brightness rearview mirror system as set forth in claim 31 including an adjustment device cooperatively associated with said first-mentioned sensor means for adjusting the gain thereof.

33. A variable brightness rearview mirror system comprising a reflecting surface for reflecting to an observer a field of view and an electrically controlled optical transmission plate disposed in the optical path between the observer and the field of view, said optical transmission plate being operable to any of a number of different states of light transmission between a state of maximum transmission and a state of maximum opaqueness, and control means for controlling the brightness of the reflected field of view seen by the observer comprising means for closed-loop regulating the state of light transmission of said optical transmission plate to compensate for changes in incident brightness over a range of different intensities of incident brightness, and said control means further comprising means for selecting a particular range of different intensities of incident brightness, from a number of possible ranges, over which said control means is effective to closed-loop, regulate the state of light transmission of said optical transmission plate, at least some of said number of possible ranges of different intensities of incident brightness having substantially identical spans, said means for selecting a particular range of different intensities of incident brightness comprising ambient light sensor means for at least in part controlling selection of the particular range.

34. A variable brightness rearview mirror system as set forth in claim 33 in which successive ones of said number of possible ranges of different intensities of incident brightness are partially overlapping.

35. A variable brightness rearview mirror system as set forth in claim 33 in which said control means comprises sensor means for providing a signal sensitive to change in brightness of incident light from the field of view, and an adjustment means for adjusting the gain of said sensor means, and wherein the particular range of different intensities of incident brightness is controlled at least in part by the adjusted gain of said sensor means.

36. A variable brightness rearview mirror system as set forth in claim 33 in which said means for selecting a particular range of different intensities of incident brightness comprises ambient light sensor means for at least in part controlling selection of the particular range, further sensor means for providing a signal sensitive to change in brightness of incident light from the field of view, and means for adjusting the gain of said further sensor means, the selection of the particular range of different intensities of incident light being conjointly determined by said ambient light sensor means and the adjusted gain of said further sensor means, the conjoint selection being such that the selected range is moved lower along a scale of ranges for decreasing intensity of ambient light and for decreasing gain of said further sensor means and the selected range is moved upwardly along a scale of ranges for increasing gain of said further sensor means and for increasing intensity of ambient light.

37. A variable brightness rearview mirror system as set forth in claim 33 in which said means for selecting a particular range of different intensities of incident brightness comprises means for causing the selected range to move from one of said possible ranges having substantially identical spans to another of said possible ranges having substantially identical spans in a downward sense along a scale of ranges for a certain decrease in ambient light intensity.

38. A variable brightness rearview mirror system comprising a reflecting surface for reflecting to an observer a field of view and an electrically controlled optical transmission plate disposed in the optical path between the observer and the field of view, said optical transmission plate being operable to any of a number of different states of light transmission between a state of maximum light transmission and a state of maximum opaqueness, and control means for controlling the brightness of the reflected field of view seen by the observer comprising means for closed-loop regulating the state of light transmission of said optical transmission plate to compensate for changes in incident brightness over a range of different intensities of incident brightness detected by a sensor means, said control means comprising a high gain differential amplifier circuit receiving a differential input signal derived from differential between a signal correlated with the degree of incident brightness of the field of view and a desired reference signal level, said desired reference signal level serving to establish an operating point of nominal incident brightness on the mirror assembly over a range of nominal incident brightnesses about which said sensor means is effective to exercise control of the optical transmission plate over said number of possible states between maximum light transmission and maximum opaqueness.

39. A variable brightness rearview mirror system as set forth in claim 38 in which said control means further includes a diode modulator circuit having an input receiving the output of the high gain amplifier, a square wave generator circuit which supplies a square wave signal to another input of said diode modulator circuit, said diode modulator circuit developing from the amplifier output signal and the square wave signal a modulated signal which is supplied to an input of a push-pull AC amplifier, and said push-pull AC amplifier having an output which drives the optical transmission plate.

* * * * *